United States Patent
Hirabayashi et al.

(10) Patent No.: US 6,219,768 B1
(45) Date of Patent: Apr. 17, 2001

(54) EMPLOYING STORED MANAGEMENT DATA FOR SUPERVISION OF DATA STORAGE

(75) Inventors: Mitsuhiro Hirabayashi; Kenichi Nakanishi, both of Tokyo; Akira Sassa, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/162,326

(22) Filed: Sep. 28, 1998

(30) Foreign Application Priority Data

Sep. 30, 1997 (JP) .................................................. 9-267173

(51) Int. Cl.$^7$ ............................. G06F 12/00; G06F 13/00
(52) U.S. Cl. ......................... 711/154; 711/103; 711/145; 714/6
(58) Field of Search ................................ 711/2, 100, 103, 711/145, 200, 205, 206, 207, 154; 714/6

(56) References Cited

U.S. PATENT DOCUMENTS

| | | | |
|---|---|---|---|
| 4,939,636 | * 7/1990 | Nakagawa et al. | 711/147 |
| 4,964,119 | * 10/1990 | Endo et al. | 370/237 |
| 5,086,438 | * 2/1992 | Sugata et al. | 375/365 |
| 5,737,550 | * 4/1998 | Song | 710/130 |
| 5,784,377 | * 7/1998 | Baydar et al. | 370/463 |
| 5,844,910 | * 12/1998 | Niijima et al. | 371/10.2 |
| 5,896,501 | * 4/1999 | Ikeda et al. | 711/203 |

* cited by examiner

Primary Examiner—Tuan V. Thai
(74) Attorney, Agent, or Firm—Frommer Lawrence & Haug, LLP.; William S. Frommer; Gordon Kessler

(57) ABSTRACT

A storage device, a data processing system and a data writing and readout method in which the area management information can be distributed and stored without affecting the transmission efficiency and in which compatibility with pre-existing storage devices can be maintained despite changes in the cell structure. A flash memory 21, a conversion unit 25 and a controller 26 are provided. The converting unit 25 converts the input area management information into an area management flag corresponding to the area management information and appended redundant data. The controller 6 causes the area management flag to be stored in the flash memory 21. The converting unit 25 converts the area management flag read out from the flash memory 21 to the original area management information. The controller 26 outputs this area management information.

12 Claims, 9 Drawing Sheets

EMPLOYING STORED MANAGEMENT DATA FOR SUPERVISION OF DATA STORAGE

BACKGROUND OF THE INVENTION

1. Field of the Invention

This invention relates to a storage device for storage of optional data, data management information for controlling this optional data and the area management information for supervising the state of the area in which to store the data, and to a data processing system employing this storage device. The invention also relates to a data writing and readout method for writing or reading out the optional data, data management information for controlling this optional data and the area management information for supervising the state of the area in which to store the data, into or from the storage device.

2. Description of the Related Art

Up to now, a card type external storage device, referred to hereinafter as a memory card, employing a flash memory (electrically erasable programmable read-only memory (ROM)) as a recording medium, has been proposed as an external data storage device used for an electronic equipment.

In this memory card, optional data and the management information as ancillary data are stored in a memory as a storage medium. When these data and the management information are sent from the memory card to e.g., a host side computer, the data or the management information is corrected for errors, using the error correction codes, to correct the data for errors produced by cell malfunctions before outputting the data or information.

As the above management information, the information for management of the state of an area for data storage (area management information), such as the information specifying whether or not the area holding the data on memory is usable, is occasionally stored, in addition to the data-dependent information for supervising the data (data management information), such as logical addresses indicating the sequence of the stored data.

Since the area management information is the information concerning an in-memory area, that is information independent of data, there may arise the necessity of rewriting the information after storage of the data, and hence the area management information is usually adapted to be rewritten by itself without rewriting the data.

Also, if an error is produced in the area management information, and a usual error correction code is used to correct the information for errors, the error correction codes need to be rewritten every time the information is rewritten. Thus, for the area management information, the same information is desirably distributed in plural bits and stored in this state in order to combat errors without employing the error correction code for error correction.

However, if the area management information is distributed in plural bits and stored in this state, transmission data is increased in length when reading out data from the memory card, thus deteriorating the transmission efficiency. Recently, there has been proposed a technique of storing the information of plural bits in a single cell. If the number of bits stored in a cell is increased, it becomes necessary to increase the number of distributed bits for combatting errors thus further deteriorating the transmission efficiency.

Also, if the cell structure of the memory card is changed, such that the manner of information distribution is changed, it becomes necessary to change the configuration of data sent from the host side to the memory card, the structure of a driver for the host side to manage the memory of the memory card or the interface specifications need to be changed to render compatibility with the existing memory card difficult. In particular, in the case of the electronic equipment having a built-in driver, such as a digital camera, new memory cards cannot be used because software version upgrading measures cannot be used.

SUMMARY OF THE INVENTION

It is therefore an object of the present invention to provide a storage device, a data processing system and a data writing and readout method whereby the area management information can be distributed and stored without deteriorating the transmission efficiency and compatibility with the pre-existing storage devices can be achieved even if the cell structure is changed.

In one aspect, the present invention provides a storage device including storage means for storing data and the area management information for supervising the state of an area for storing the data, conversion means for converting the input area management information into an area management flag corresponding to the area management information and redundant data appended thereto or converting the area management flag read out from the storage means back into the original area management information, and control means for writing the area management flag converted by the conversion means in storage means or reading out the area management flag from the storage means to send the read-out flag to the conversion means to output the original area management information converted by the conversion means.

With this storage device, the input area management information is converted by conversion means into an area management flag having the number of bits larger than the area management information. The area management flag converted by the conversion means is written by the control means in the storage means.

With the present storage device, the area management flag read out from the storage means by the control means is converted by conversion means into the original area management information. The area management information thus converted by the conversion means is outputted under control by control means.

With the present storage device, the conversion means preferably includes a conversion table in which the area management information and the area management flag are recorded in association with each other. The conversion means converts the input area management information into the area management flag by having reference to the conversion table.

With the present storage device, the conversion means preferably includes a flag discrimination circuit for discriminating the original area management information from a pattern of the area management flag read out from the management information storage area of the storage means. In this case, the conversion means converts the area management flag read out from the storage means to the original area management information.

In another aspect, the present invention provides a data processing system including a storage device for storing data and the area management information for supervising the state of an area for storing the data, and a data processing device for sending the data and the area management information to the storage device or processing the data supplied from the storage device and the area management information. The, storage device converts the area management information supplied from the data processing device into an area management flag corresponding to this area management information having appended redundant data. The storage device also converts the stored area management flag to the original area management information to supply the original area management information to the data processing device.

Preferably, the storage device has a conversion table in which the area management information and the area management flag are recorded in association with each other and the input area management information is converted into the area management flag by having reference to the conversion table.

Preferably, the storage device has a flag discrimination circuit for discriminating the original area management information from a pattern of the stored area management flag and the stored area management flag is converted into the area management information using this flag discrimination circuit.

Preferably, the storage device has a flash memory and the storage device converts the area management information into an area management flag of at least three bits per bit of the information, distributes the flag in at least three cells of flash memory and stores the flag in this distributed state in the cells.

In yet another aspect, the present invention provides a data writing and readout method in which data and the area management information for supervising the state of an area for storing the data are written in a storage device or the data and the area management information written in storage device are read out from the storage device. The method includes converting the area management information entering the storage device during data writing into an area management flag corresponding to the area management information and redundant data appended thereto, writing the converted flag in storage device, converting the read-out area management flag during data readout to the original area management information and outputting the resulting original area management information from the storage device.

Preferably, the storage device has a conversion table in which the area management information and the area management flag are recorded in association with each other, and the input area management information is converted during data writing into an area management flag by having reference to this conversion table.

Preferably, the storage device has a flag discrimination circuit for discriminating the original area management information from the pattern of the read-out area management flag, and the read-out area management flag is converted during data readout into the original area management information using this flag discrimination circuit.

Preferably, the storage device has a flash memory, and the area management information is converted into an area management flag of at least three bits per bit of the information and distributed and written in at least three cells of flash memory.

DESCRIPTION OF THE PREFERRED EMBODIMENTS

Figure 1:
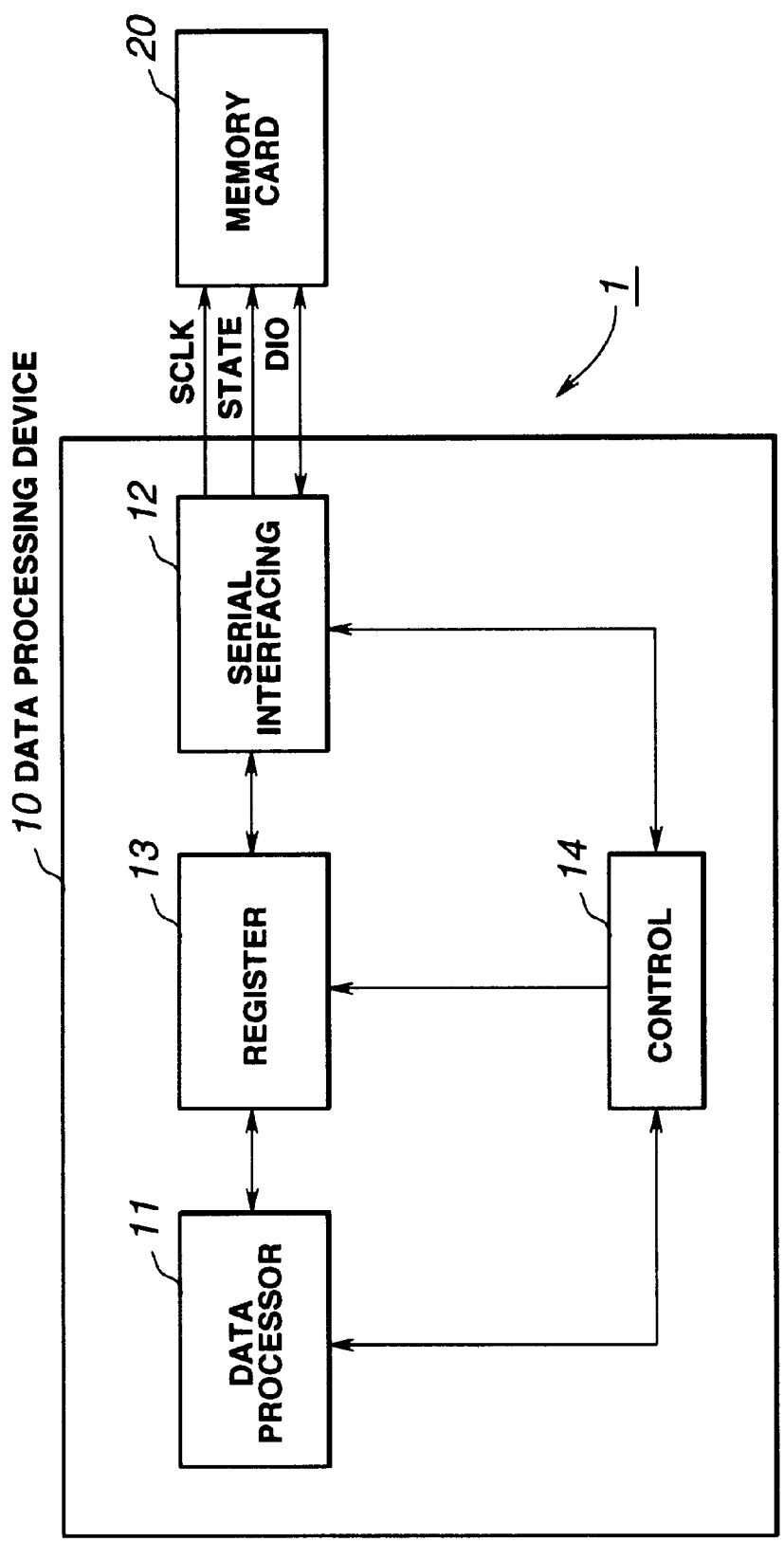
FIG. 1 is a block diagram showing the structure of a data processing apparatus.

Referring to the drawings, preferred embodiments of the present invention will be explained in detail.

In an embodiment shown in FIG. 1, the present invention is applied to a system 1 made up of a data processing device 10 as a host-side device and a memory card 20 as an external storage device connected to this data processing device 10 via a serial interface.

Although the system shown herein is adapted to exchange data between the data processing device 10 and the memory card 20 via a serial interface, the present invention is also applicable to a system in which data exchange is via a parallel interface.

The data processing device 10, used in the present system 1, includes a data processing unit 11, for executing a defined program, a serial interfacing circuit 12 for exchanging data with the memory card 20 as the external device, a register 13 provided between the data processing unit 11 and the serial interfacing circuit 12 for transiently storing data sent from the data processing unit 11, and a controller 14 connected to the data processing unit 11, serial interfacing circuit 12 and to the register 13 for controlling the processing by these components.

If, when the data processing unit 11 executes a defined program, the data processing device 10 has found that data needs to be stored in the memory card 20 as the external storage device, the data processing unit 11 writes data for storage, management information required for supervising the data or write commands as the control data in the register 13 under control by the controller 14.

The serial interfacing circuit 12 reads out the data for storage, management information or the write commands from the register 13, under control by the controller 14, and converts them into serial data which is transferred along with clock signals and status signals. The management information is made up of the data management information as the information for supervising the data and the area management information for supervising the status of the area in which to store the data.

Also, if the data processing unit 11 of the data processing device 10 finds that, for executing a defined program, data needs to be read from the memory card 20 as the external storage device, the data processing unit 11 writes the readout command as the control data in the register 13 under control by the controller 14. The serial interfacing circuit 12 reads out the readout command from the register 13, under control by the controller 14, to transfer the serial data along with clock signals and the status signals.

The data or the management information, transferred from the memory card 20 in accordance with the readout command, is converted by the serial interfacing circuit 12 into parallel data, which is written in the register 13. The data processing unit 11 reads out these defined data or the management information from the register 13, under control by the controller 14, in order to effectuate the processing.

There is no particular limitation to the data processing device used in the system of the present invention provided that it enables data exchange with the external storage device, such as memory card 20. Thus, a variety of data processing devices, such as personal computers, digital still cameras or digital video cameras, may be used.

In the present system 1, the data processing device 10 and the memory card 20 are interconnected over a serial interface, specifically, over at least three data lines SCLK, State and DIO. That is, the data processing device 10 and the memory card 20 are interconnected at least by a first data line SCLK for transmitting clock signals during data transmission, a second data line State for transmitting status signals required for data transmission, and a third data line DIO for serially transmitting data written in the memory card 20 or data read out from the memory card 20, in order to exchange data via these data lines.

Figure 2:
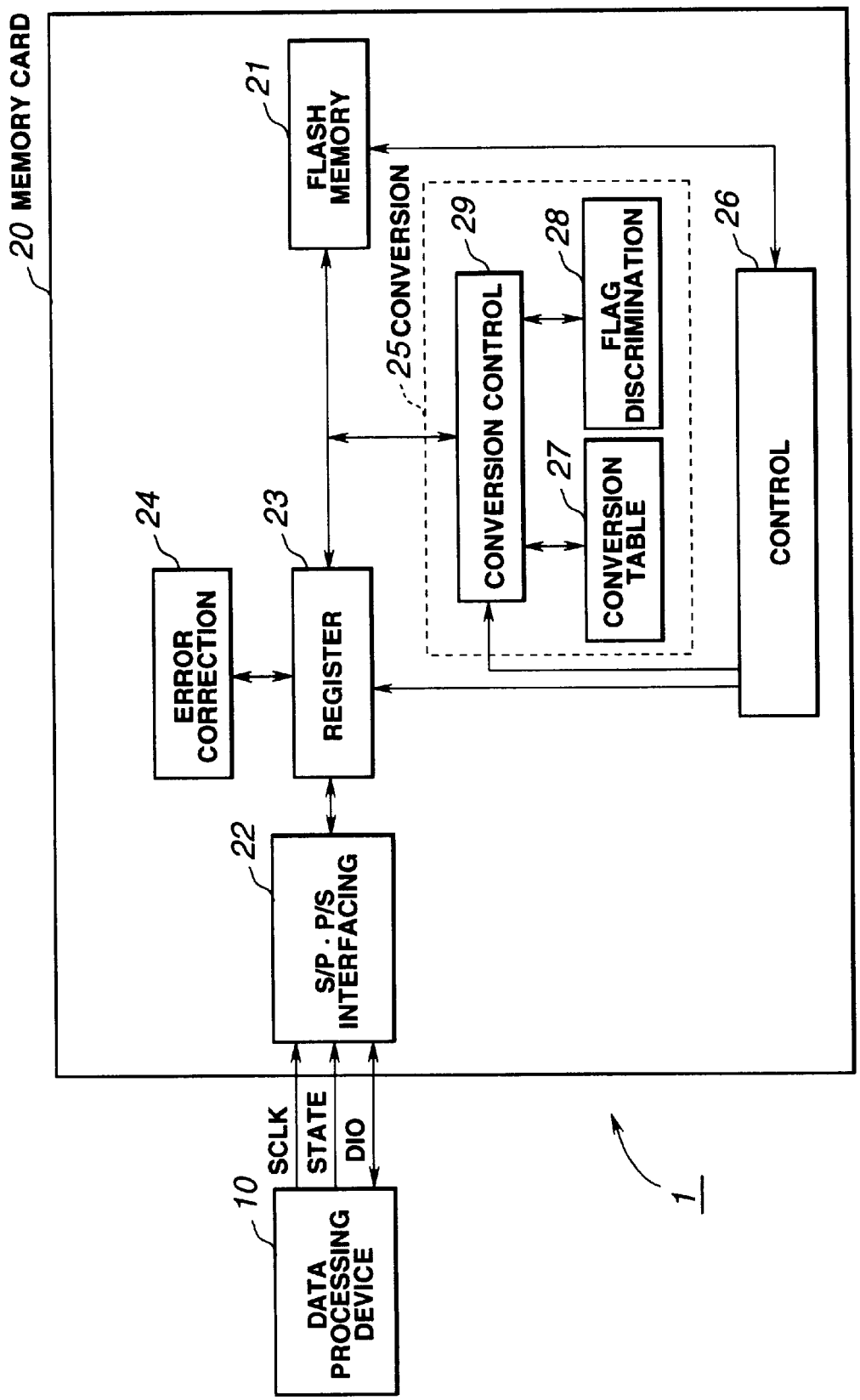
FIG. 2 is a block diagram showing the structure of a memory card.

Referring to FIG. 2, the memory card 20 includes a flash memory 21 for holding defined data or the management information on memory, and a serial/parallel-parallel/serial interfacing circuit (S/P-P/S interfacing circuit 22) for exchanging data with the data processing device 10. The memory card 20 also includes a register 23 provided between the flash memory 21 and the S/P-P/S interfacing circuit 22 for transient storage of data or the management information supplied from the S/P-P/S interfacing circuit 22 and an error correction circuit 24 connected to the register 23 to correct the data written in the register 23 or the data management information for errors based on the error correction code. The memory card 20 also includes a converting unit 25 for converting the area management information read out from the register 23 into the information comprised of this area management information and redundant data appended thereto (termed herein the area management flag) or converting the area management flag read out from the flash memory 21 to the original area management information. The memory card 20 further includes a controller 26 connected to and adapted for controlling the processing operation of the flash memory 21, S/P-P/S interfacing circuit 22, register 23 and the converting unit 25.

The S/P-P/S interfacing circuit 22 is connected via at least the above-mentioned three data lines SCLK, State and DIO to the serial interfacing circuit 12 of the data processing device 10 in order to exchange data with the data processing device 10 via these data lines SCLK, State and DIO. That is, the S/P-P/S interfacing circuit 22 converts the serial data sent from the serial interfacing circuit 12 of the data processing device 10 into parallel data which is written in the register 23. The S/P-P/S interfacing circuit 22 also converts the parallel data read out from the register 23 to route the converted serial data to the serial interfacing circuit 12 of the data processing device 10.

The serial data is transmitted between the S/P-P/S interfacing circuit 22 and the data processing device 10 over the first data line SCLK as synchronization is achieved by clock signals sent from the data processing device 10. At this time, the data type of the serial data exchanged over the third data line DIO is discriminated by the status signal exchanged over the second data line State. The data types may be enumerated by, for example, data to be stored in the flash memory 21, data read out from the flash memory 21 and control data for controlling the operation of the memory card 20.

If data sent from the data processing device 10 is control data, such as the write command or the readout command, the S/P-P/S interfacing circuit 22 routes the control data to the controller 26.

The controller 26 controls the operation of the memory card 20 based on control data supplied from the S/P-P/S interfacing circuit 22.

The register 23 transiently stores data exchanged between the flash memory 21 and the S/P-P/S interfacing circuit 22.

The error correction circuit 24 appends error correction codes to data written in the register 23 by the S/P-P/S interfacing circuit 22. The error correction circuit 24 also corrects the data read out from the flash memory 21 and written in the register 23 for errors.

The converting unit 25 converts the area management information of the management information read out from the register 23 into the area management flag, while converting the area management flag read out from the flash memory 21 into the original area management information.

If the data, management information and the write command to be stored are sent as serial data from the data processing device 10 to the memory card 20, the S/P-P/S interfacing circuit 22 converts these data into parallel data to send the write command to the controller 26 while writing defined data and the management information in the register 23 under control by the controller 26.

To the defined data and the management information, thus written in the register 23, an error correction code for other than the area management information is appended by the error correction circuit 24.

The controller 26 performs control to read out the defined data and management information from the register 23 to write the read out data or information in the flash memory 21 under a write command sent from the S/P-P/S interfacing circuit 22. At this time, the controller 26 first sends the area management information of the management information read out from the register 23 to the converting unit 25. The area management information sent to the converting unit 25 is converted thereby to an area management flag. The controller 26 causes the area management flag converted by the converting unit 25 to be written in the flash memory 21.

When a readout command is sent from the data processing device 10 to the memory card 20, the S/P-P/S interfacing circuit 22 sends this readout command to the controller 26.

The controller 26 operates on the basis of the readout command sent from the S/P-P/S interfacing circuit 22 to read out defined data and management information from the flash memory 21 to write the read-out data or information in the register 23. The controller 26 causes the area management flag sent from the flash memory 21 to be sent to the converting unit 25. The area management flag sent to the converting unit 25 is thereby converted back to the original area management information. The controller 26 causes the original area management information converted by the converting unit 25 to be written in the register 23.

If there is any error in the data management information of the data or management information written into the register 23, it is corrected by the error correction circuit 24 based on the error correction code.

The S/P-P/S interfacing circuit 22 operates under control by the controller 26 to read out defined data and the management information from the register 23 to convert the read-out data or information into serial data which is sent to the data processing device 10.

The foregoing description is directed to a system in which the error correction circuit 24 is provided in the memory card 20 and error correction is made in the memory card 20. The present invention can, however, be applied to a system in which the data processing device has an error correction circuit and error correction is made by the data processing device. In this case, it is data having the error correction code appended thereto that is exchanged between the data processing device 10 and the memory card 20.

The structure of the storage area of the flash memory 21 loaded on the memory card 20 is hereinafter explained.

Figures 3A, 3B, 3C:
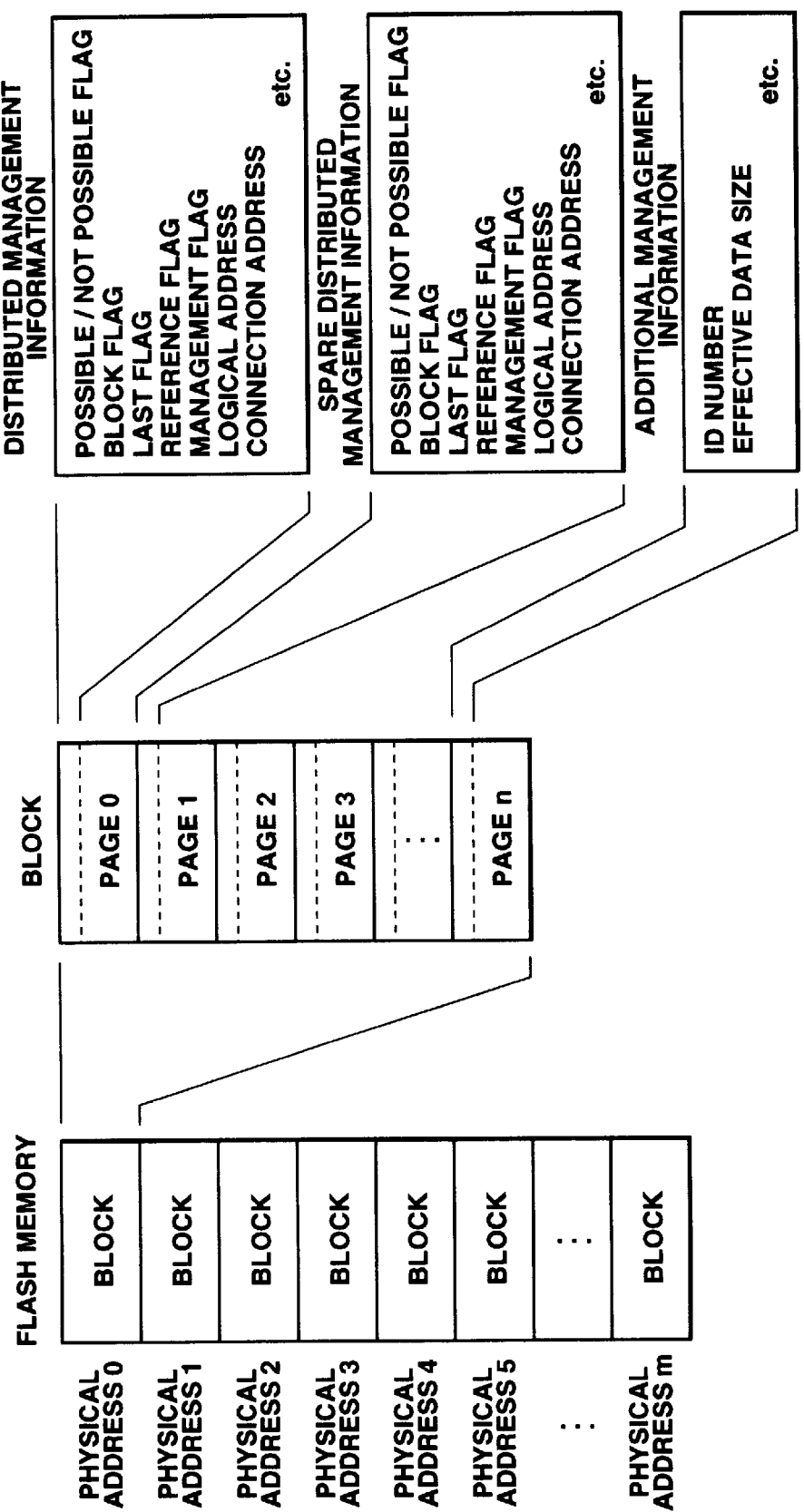
FIG. 3 including 3A, 3B and 3C, is a schematic view showing the structure of a storage area of a flash memory.

The storage area of the flash memory 21 is made up of a large number of cells as storage units and is split into plural blocks as data erasure units, as shown in FIG. 3a. To these blocks are allocated physical addresses proper to the respective blocks.

Each block is a data erasure unit and simultaneously the minimum unit for file management. That is, the file is stored in one or plural blocks and is designed so that the same block cannot be utilized by plural files.

Each block is composed of plural cells in each of which the information that can take two states denoting "1" and "0" is stored.

In the initial state, all bits of each block are set to "1" such that bit-based change is possible only from "1" or "0". Therefore, if data made up of "1" and "0" is to be written in the flash memory 21, the bits for "1" are kept, while bits for "0" are changed from "1" to "0" prior to data writing.

If data, once written, is erased from the flash memory 21, data are initialized in a lump on the block basis to set all bits of the block to "1". This erases the data written in the block in a lump so that the block is again in the state of allowing for data writing.

Each block of the flash memory 21 is made up of plural pages as data writing or readout unit, as shown in FIG. 3b. Each page represents a storage unit having a recording capacity of, for example, 512 bytes. When writing data in the flash memory 21, data read out from the register 23 on the page unit is written on the page basis in the flash memory 21. When reading out data from the flash memory 21, data are read out by the controller 25 on the page basis and thence sent to the register 23.

Each page representing a data writing or readout unit has a data storage area and a management information storage area. The data storage area means an area in which to write optional data, and the management information storage area means an area in which to store the information required for management of data written in the data storage unit (management information).

The management information storage area has an area of 16 bytes, of which the first three bytes are set as an overwrite area for which the information can be rewritten without block-based lumped initialization. The remaining 13 bytes are set as a usual area for block-based lumped initialization at the time of rewriting the information.

The management information is stored in the management information storage area of each page constituting a block. Specifically, the so-called distributed management information, as the information necessary for management of the block in question, is stored in the management information storage area in the beginning page of each block, as shown in FIG. 3c. There is also stored, as the spare distributed management information, the same management information as the distributed management information stored in the management information storage area of the beginning page in the management information storage area of each page as from page 2 of each block. It is noted that the so-called additional management information other than the distributed management information for seeking out the otherwise deficient information is stored in the management information storage area of the last page of each block.

Thus, the distributed management information for supervising the respective blocks is stored in the management information storage area in each block in the flash memory 21 loaded on the memory card 20. The information as to whether or not the block in question is the leading end block of the file and, if the file is constituted by plural files, the information specifying the block linkage, can be acquired by this distributed management information.

By collecting the distributed management information of each block, the memory card 20 formulates the so-called collective management information as the information for supervising the flash memory 21 in its entirety in order to store the collective management information as a file in the flash memory 21.

If data is to be exchanged between the data processing device 10 and the memory card 20, the data processing device 10 usually reads out the collective management information from the flash memory 21 to obtain the information required for accessing each block. This eliminates the necessity of accessing to the distributed management information stored in each block for each data accessing to enable more expeditious data accessing.

The distributed management information, additional management information and the collective management information will be explained more specifically.

Figure 4:
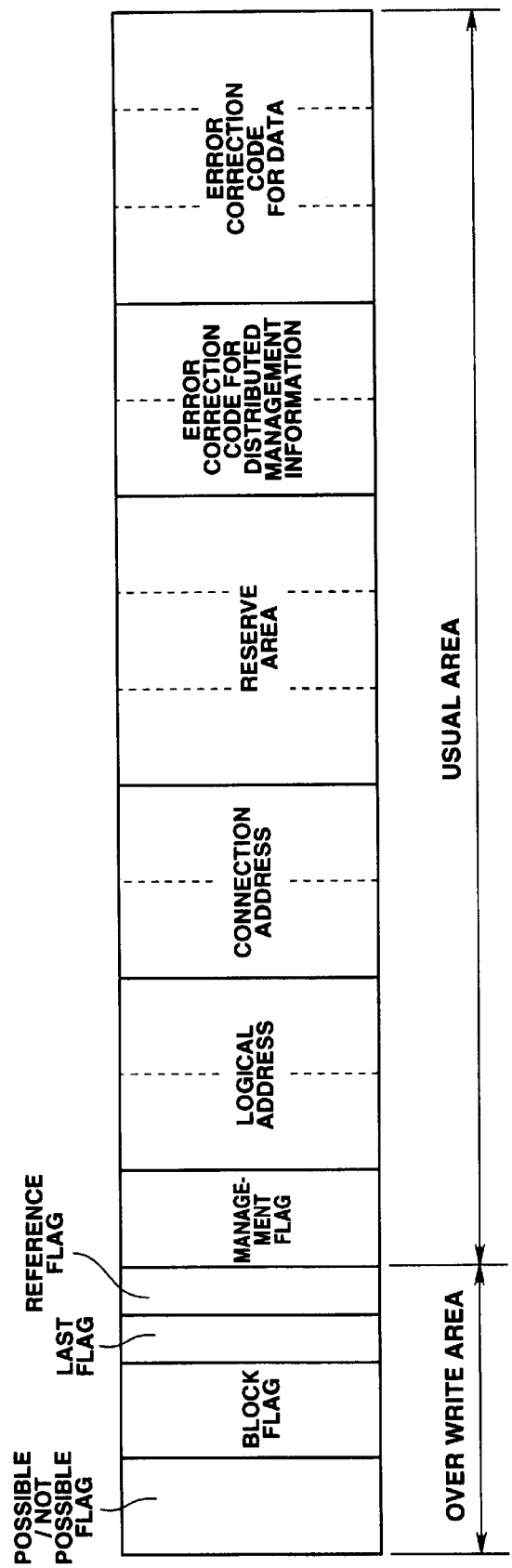
FIG. 4 is a schematic view for illustrating the distributed management information.

The distributed management information is the management information for block management stored in a 16-byte management information storage area provided in each page. This distributed management information is made up of a 1-byte possible/not possible flag, a 1-byte block flag, a 4-bit last flag, a 4-bit reference flag, a 1-byte management flag, a 2-byte logical address, a 2-byte connection flag, a 2-byte distributed management information error correction code and a 3-byte data error correction flag, as shown in FIG. 4. Of these flags, the possible/not possible flag, block flag, last flag and the reference flag are stored in the initial 3-byte overwrite area of the management information storage area.

In the usual 13-byte area of the management information storage area are stored the management flag, logical address, reserve area, error correction code for distributed management information and the error correction code for data. The remaining 3 bytes of the usual area are set as a reserve area.

The possible/not possible flag denotes whether a block is in the usable state or in the non-usable state. That is, if an error that cannot be recovered is produced in a block, the possible/not possible flag specifies that the block in question is in the non-usable state.

The block flag specifies the usable state of the block. Specifically, the block flag indicates four states of "not used as yet", "used at the leading end", "used" and "not erased as yet". Of these, the block flag "not used as yet" specifies that the block is not used as yet or already erased and is in an initial state, with all bits being "1", such that data can be written at once. The block flag "used at the leading end" specifies that the block in question is used at the leading end of the file. The block flag "used" specifies that the block in question is being used in other than the leading end of the file. That is, if the block flag is "used", it indicates that the block in question is connected from other blocks. The flag "not erased as yet" specifies that data written in the block is not needed. In the present memory card 20, if unneeded data stored in the block is erased, the block flag is first set to the "non-erased" state and, if there is allowance in the processing time, the block whose block flag is "not erased as yet" is erased. This permits the memory card 20 to perform data erasure processing more efficiently.

The last flag is a flag indicating whether or not the file terminates with the block in question and specifically is a flag specifying two states, namely a "blocks continuing" and "last block". The state "blocks continuing" specifies that the files stored in the block in question are not depleted and continue to other block(s). The state "last block" specifies that the file stored in the block in question terminates with this block.

The flag "reference" is a flag for designating reference to the additional management information and specifically showing the two states of "no reference information exists" and "reference information exists". The state "no reference information exists" specifies that there is no effective additional management information in the management information storage area of the last page of the block. The state "reference information exists" specifies that there exists the effective additional management information in the management information storage area of the last page of the block.

The management flag specifies block attributes and, as an example, specifies an attribute such as the block being a read-only block or an attribute such as the block being also writeable.

The logical address specifies the logical address of the block in question. The value of the logical address is updated as the occasion may demand for e.g., data rewriting. Meanwhile, the values of the logical addresses are set so that the same value of the logical address will not be owned simultaneously by plural blocks.

The connection address specifies the logical address of other blocks connected to the connection block. That is, if the file connected to the block in question connects to other block(s), the connection address indicates the value of the logical address in which the remaining portion of the file is stored.

The error correction code for the distributed management information is the error correction code for data of the distributed management information written in the management flag, logical address, connecting address and in the reserve area.

The error correction code for data is the error correction code for data stored in the data storage area of a page in which has been written the error correction code for data.

The possible/not possible flag, block flag, last flag and the reference flag of the above-mentioned distributed management information represent the information for supervising the state of the data storage area, that is the area management information. Since there arises the necessity for rewriting the reference flag independently of data, it is not subjected to error correction by the error correction code for the above-mentioned distributed management information and is stored in the management information storage area as a flag (area management flag) having redundant data of a defined amount of the same code as the code specifying the information item in order to combat errors.

Figure 5:
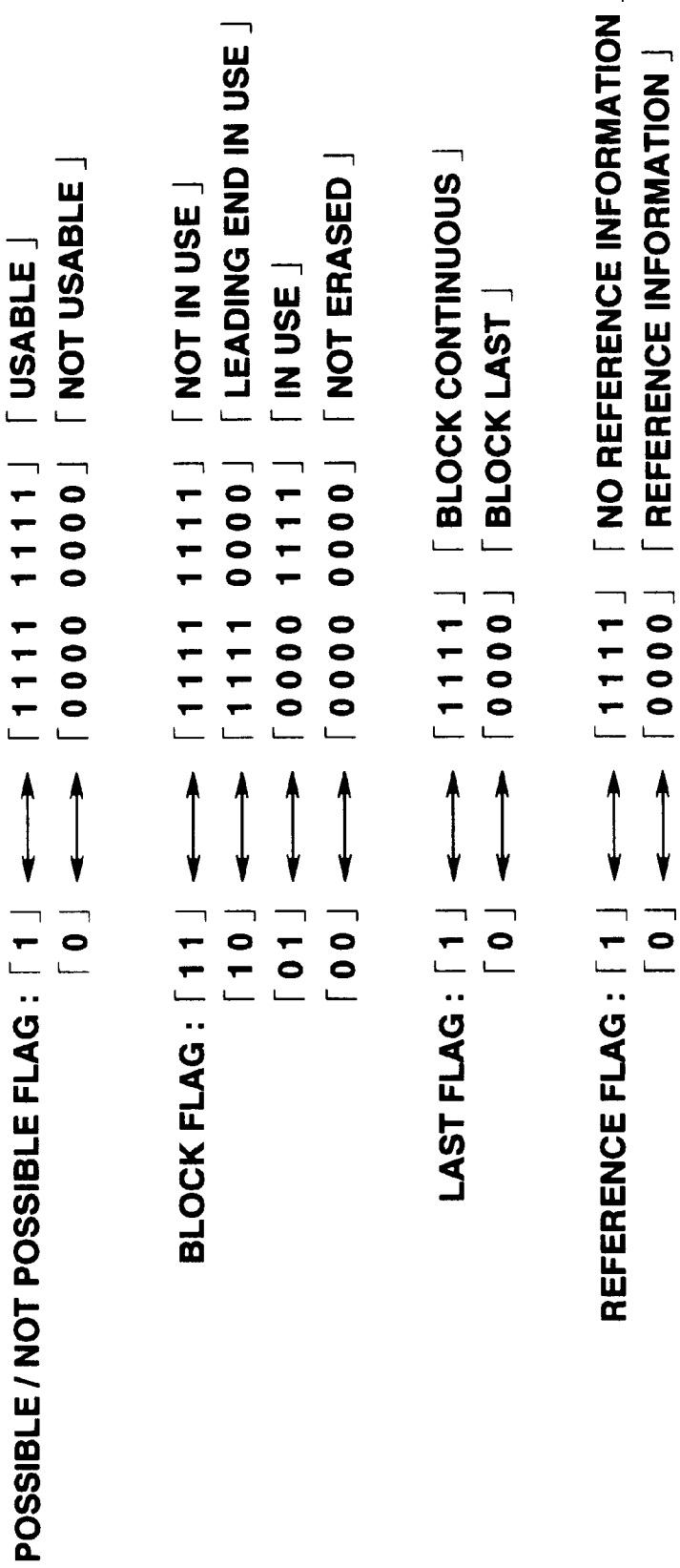
FIG. 5 is a schematic view showing an example of an area management flag.
Figure 6:
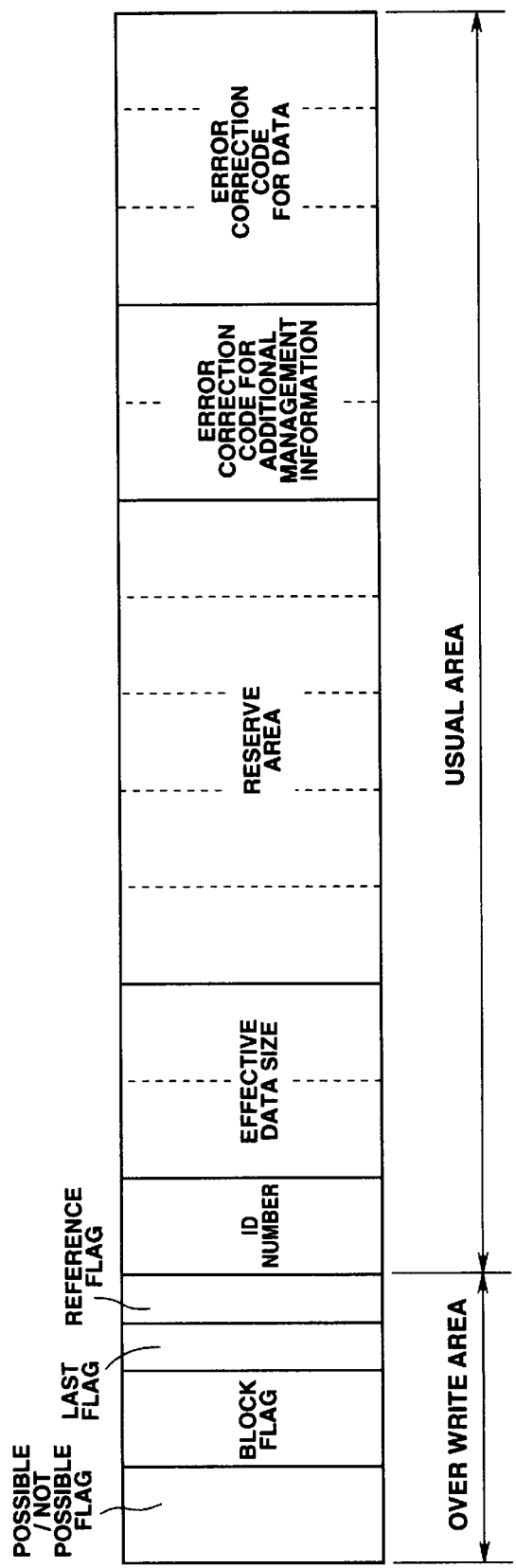
FIG. 6 is a schematic view for illustrating the additional management information.

Specifically, these items of the area management information are stored in an overwrite area of the management information storage area as an area management flag having appended redundant data, as shown in FIG. 5.

That is, the possible/not possible flag is denoted by the 1-bit information "1" and the "1"-bit information "0" if the block is in the usable state or in the unusable state, respectively. For storage in the management information storage area, the possible/not possible flag is converted to, for example, the 1-byte information "11111111" or "00000000" by appendage of redundant bits prior to storage.

The block flag is denoted by the 2-bit information "11", "10", "01" and "00" if the block is "not used as yet", "used at the leading end", "used" and "not erased as yet", respectively. For storage in the management information storage area, the block flag is converted to, for example, the 1-byte information "1111 1111", "1111 0000", "0000 1111", "0000 0000" by appendage of redundant bits for storage.

The last flag is denoted by the 1-bit information "1" and the 1-bit information "0" for "blocks continuing" and "Last block", respectively. For storage in the management information storage area, the last flag is converted by appendage of redundant data into, for example, the 4-bit information "1111" or "0000" prior to storage.

The reference flag is denoted by the 1-bit information "1" and the 1-bit information "0" if "there is no reference information" and if "there is reference information", respectively. For storage in the management information storage area, the reference flag is converted into, for example, the 4-bit information "1111" or "0000" prior to storage.

Since the area management information is stored in the management information storage area as an area management flag having the redundant data appended thereto, the original area management information can be recognized by comparing the numbers of "1"s and "0"s of the area management flag even if an error is produced as a result of malfunctions of the cell holding the flag in question.

The additional management information is the information stored in the 16-byte management information storage area of the last page of the block, and includes the additional information for eking out otherwise insufficient information.

This additional management information is made up of, for example, a 1-byte possible/not-possible flag, a 1-byte block flag, a 4-bit last flag, a 4-bit reference flag, a 1-byte identification number, a 2-byte effective data size, a 2-byte error correction code for the additional management information and a 3-byte error correction code for data.

The possible/not-possible flag, block flag, last flag, reference flag and the error correction code for data are similar to those for the distributed management information. The error correction code for the additional information is equivalent to the error correction code for the distributed management information and is used for the identification number excluding the area management flag of the additional management information, effective data size and data written in the reserve area.

The identification number and the effective data size are included in the additional management information as the additional information which ekes out the otherwise deficient distributed management information.

Similarly to the distributed management information, the additional management information is the possible/not-possible flag, block flag, last flag and the reference flag, as the area management flag, having the appended redundant data, and is stored in the overwrite area of the first three bytes of the management information storage area.

In the 13-byte ususal area of the management information storage area are stored the identification number, effective data size, error correction code for additional management information and the error correction code for data. The remaining 5 bytes of the usual area are set as a reserve area.

The identification number is the information for error processing. The value of the identification number is incremented each time the block data is rewritten. If an error of some sort is produced such that there exist plural blocks having the same logical addresses, the identification number is used for discriminating whether the data written in these blocks is new or old. Meanwhile, a 1-byte area is used for the identification number, its value ranging from "0" to "255", with the initial value, that is the value of the identification number initially set when using the new logical address, being "0". If the identification number exceeds 255, it is reset to 0. If there exist plural blocks having the same logical number, a block having a smaller value of the identification number is valid.

The effective data size indicates the size of effective data in a block. That is, if there is vacancy in the data storage area in the block, the effective data size specifies the value of the size of data written in the data storage area in question. At this time, the reference flag is set to "reference information exists". If there is no vacancy in the data storage area in the block, the effective data size is set to "0xffff" as the information specifying that there is no vacancy in the data storage area in the block.

Meanwhile, the above-described distributed management information and the additional management information are updated each time the in-block data is updated so as to represent the latest information.

Figure 7:
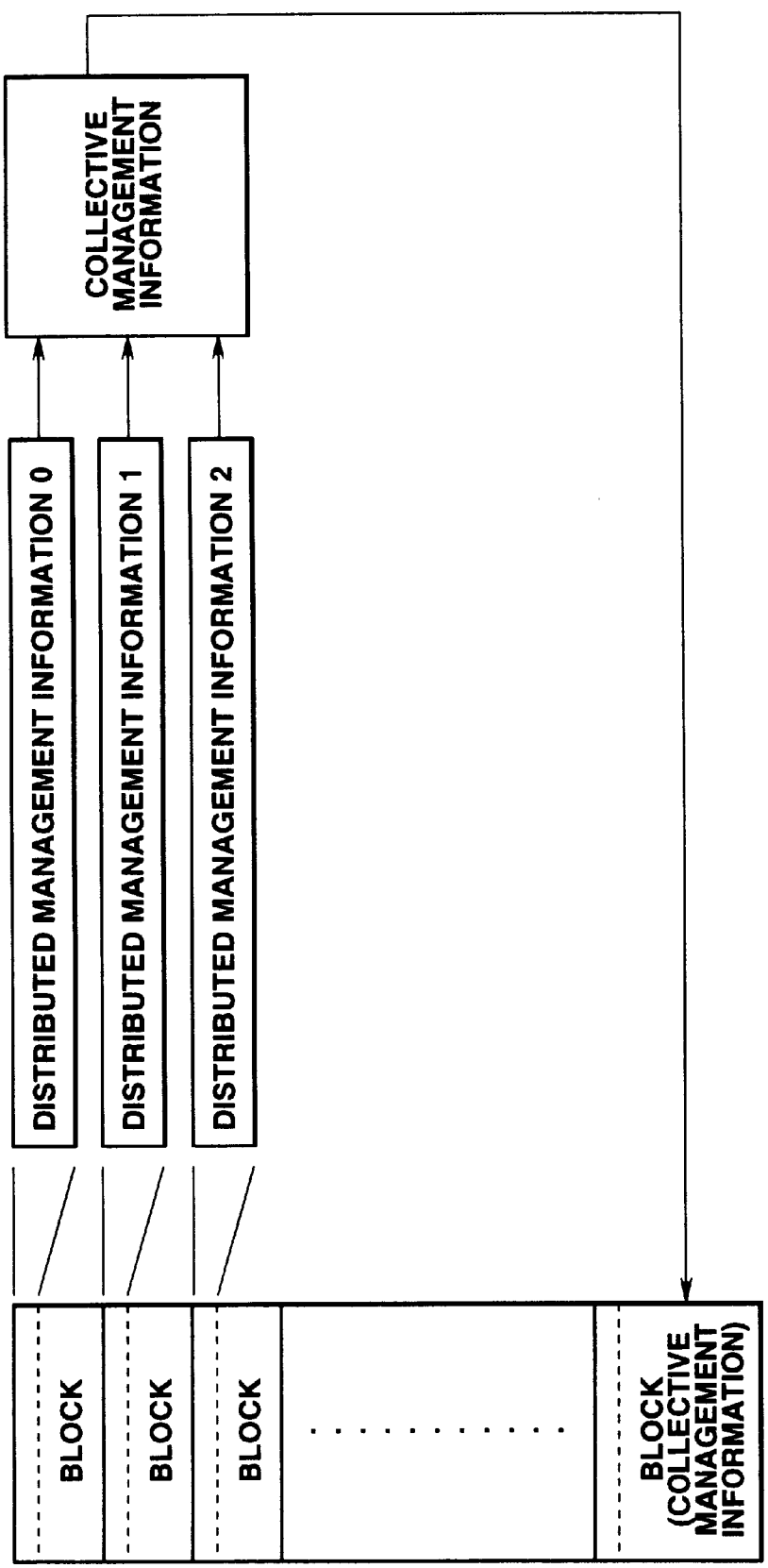
FIG. 7 is a schematic view for illustrating the structure of the collective management information.

The collective management information is the information formulated by collecting the distributed management information of each block and is stored as a file in the flash memory 21. That is, a file of the collective management information, which is the information for management of all files, collected together, is formulated from the block-based distributed management information, and stored in a data storage area of a defined block, as shown in FIG. 7. The collective management information may be stored in a sole block or across plural blocks. The data processing device 10 usually acquires the information for accessing to each block by this collective management information.

Of the management information, as the information required for data management, the area management information is converted by the converting unit 25 into an area management flag having redundant data, so as to be stored in the management information storage area of the flash memory 21 of the memory card 20, more specifically the overwrite area in the management information storage area. The area management flag, read out from the flash memory 21, is converted by the converting unit 25 into the original area management information which is transferred via register 23 and S/P-P/S interfacing circuit 22 to the data processing device 10.

The converting unit 25, adapted for converting the area management information read out from the register 23 into the area management flag or converting the area management flag read out from the flash memory 21 into the original area management flag, is explained in detail.

The converting unit 25 includes a conversion table 27, a flag discrimination circuit 28 and a conversion controller 29, as shown in FIG. 1.

In the conversion table 27, there are recorded the area management information and the area management flag in association with each other. In this conversion table 27, there are recorded, in association with the possible/not possible flag, "1" of the area management information and "1111 1111" of the associated area management flag, as well as "0" of the area management information and "0000 0000" of the associated area management flag In the conversion table 27, there are also recorded, in association with the block flag, "11" of the area management information and "1111 1111" of the associated area management flag, "10" of the area management information and "1111 0000" of the associated area management flag, "01" of the area management information and "0000 1111" of the associated area management flag and "00" of the area management information and "0000 0000" of the associated area management flag.

In the conversion table 27, there are also recorded, in connection with the last flag, "1" of the area management information, "0000 1111" of the associated area management flag, "0" of the area management information and "0000 1111" of the associated area management flag.

In the conversion table 27, there are also recorded, in connection with the reference flag, "1" of the area management information, "1111" of the associated area management flag, "0" of the area management information and "0000" of the associated area management flag.

When the area management information is sent to the conversion unit 25, the conversion controller 29 refers to the conversion table 27 to convert the supplied area management information to the area management flag associated with this area management information.

The flag discrimination circuit 28 discriminates the original area management information from a pattern of the area management flag read out from the flash memory 21. That is, the f28 is configured for discriminating the original area management information from the pattern of an error-corrupted area management flag even although such error ascribable to cell malfunctions is produced in the area management flag stored in the flash memory 21.

Specifically, assume that, if "1" of the area management information is stored as the area management flag "1111" in the memory 21, in connection with the last flag, and an error is produced in the area management flag due to cell malfunction, such that "1111" is changed to "1110", "1101", "1011" or to "0111". In this case, the flag discrimination circuit 28 compares the number of "0"s and "1"s of the area management flag to find that the information with a larger number, that is "1", is the original area management information.

The conversion controller 29 writes the information, discriminated by the flag discrimination circuit 28, as being the original area management information, in the register 23.

The foregoing description has been directed to an instance of storing the 1-bit area management information for the possible/not possible flag as a 1-byte area management flag in the flash memory 21, and storing the 2-bit area management information for the block flag as a 1-byte area management flag, while storing the 1-bit area management information for the last flag as a 4-bit area management flag in the flash memory 21, and storing the 1-bit area management information for the reference flag as a 4-bit area management flag in the flash memory 21. The manner of appending the redundant data is not limited to this configuration because it can be optionally selected, even in case of cell malfunctions, based on the ratio of the number of the malfunctioning cells to that of the entire cells in the flash memory 21 within a range of possible discrimination of the original area management information.

If the cell malfunction ratio is low, two bits of redundant data can be appended to the 1-bit area management information for conversion to a 3-bit area management flag for storage separately in three cells. In this case, if malfunction occurs in one of the three cells, the original area management information can be discriminated by comparing the numbers of "0"s and "1"s by the flag discrimination circuit 28. However, if the number of bits of the redundant data appended to the area management information is increased, the data reliability is improved correspondingly.

The memory card 20 of the present invention has the converting unit 25 as described above for converting the input area management information to an area management flag comprised of the management information having appended data and for storage of the resulting flag in the flash memory 21, so that, if an error is produced in the stored area management flag due to cell malfunctions in the flash memory 21, the flag can be corrected for errors to output the original area management information without using the error correction codes.

Also, for exchanging data between the memory card 20 and the data processing device 10, the area management information not having the redundant data appended thereto, that is the original area management information, is transmitted, so that the transmission efficiency is not lowered as a result of appendage of the redundant data. Moreover, if the manner of appendage of the redundant data is modified, there is no necessity of changing the structure of the data processing device 10 in order to cope with such change thus assuring interchangeability between memory cards.

Although the foregoing description is directed to a so-called bi-level flash memory for storage of a single bit in a sole cell, the present invention can also be applied to a memory card carrying a so-called multi-valued flash memory in which each cell can store two or more bits.

In a flash memory adapted for storing the information of two bits in a sole cell, two-bit errors are produced in case of malfunction of a sole cell. Thus, for storage of the area management information of, for example, one bit in this flash memory 21, the area management information is desirably converted to an area management flag of at least five bits for storage in three cells. If, in a flash memory adapted for storing the information of two bits in a sole cell, the 1-bit area management information is converted into an area management flag of at least five bits which is stored in three cells, the original area management information can be recognized by the flag discrimination circuit 28 of the converting unit 25 comparing the numbers of "1"s and "0"s of the area management flag even if one of the cells holding the area management flag is in disorder to produce the two-bit error.

Figure 8:
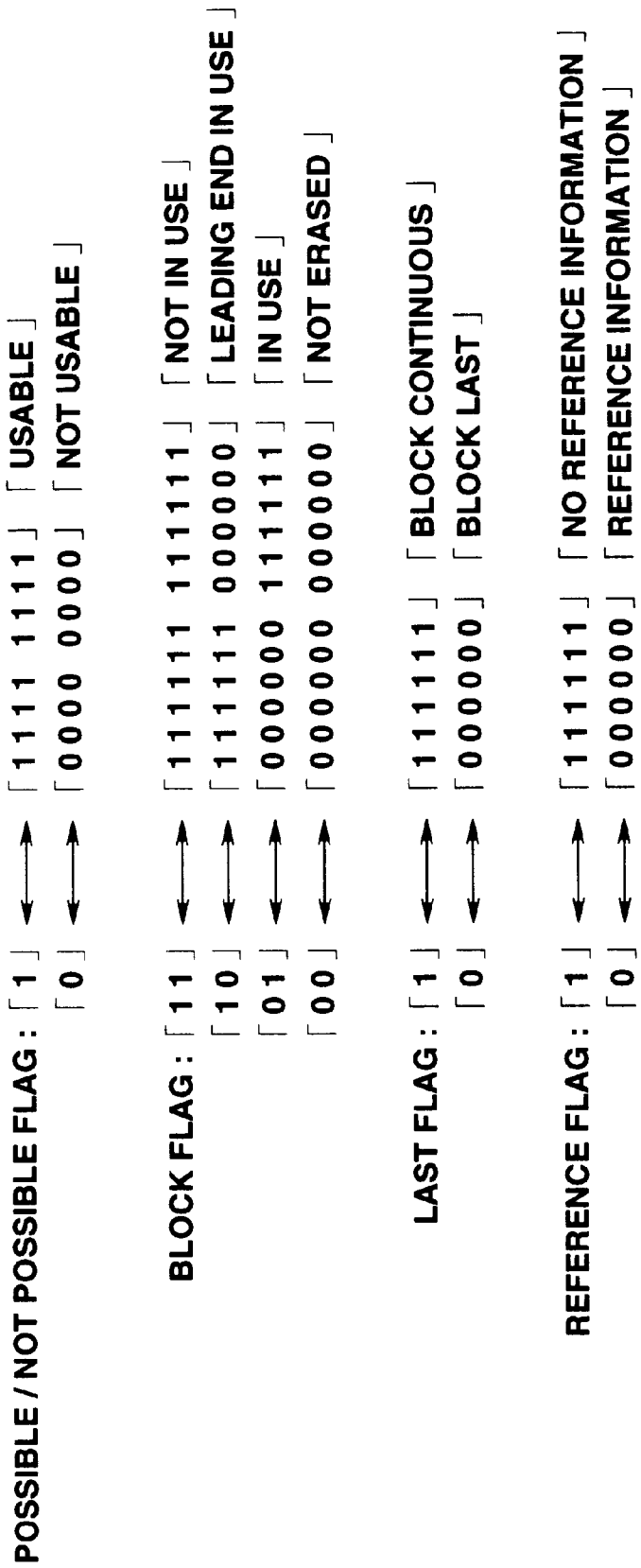
FIG. 8 is a schematic view for illustrating another example of an area management flag.
Figure 9:
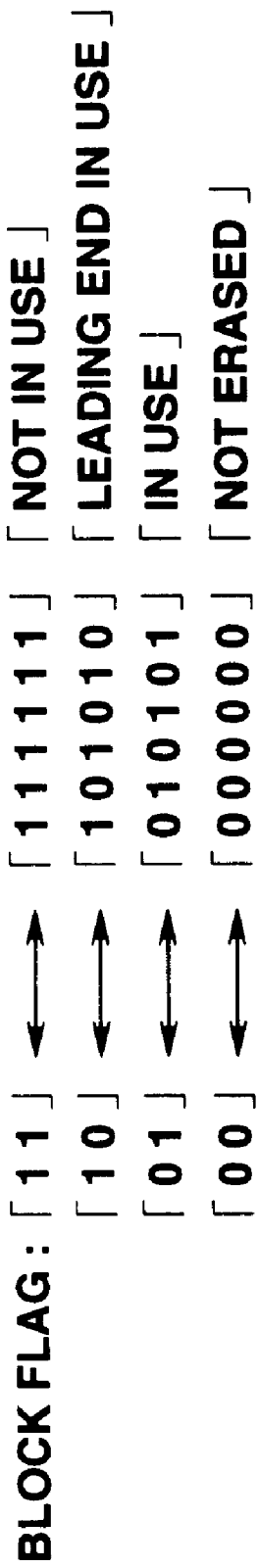
FIG. 9 is a schematic view for illustrating yet another example of an area management flag.

Specifically, in storing the area management information in the management information storage area of the flash memory adapted for storage of the two-bit information in a cell, redundant data is appended to the area management information and the resulting data is stored as the area management flag, as shown in FIG. 8. Meanwhile, in order for the flag discrimination circuit 28 of the converting unit 25 to recognize the original area management information, it suffices if the one-bit area management information is converted to a five-bit area management flag. However, since data can be handled more easily when converted into even-numbered bits, the embodiment shown in FIG. 8 is configured so that the one-bit area management information is converted to the 6-bit or 1-byte area management flag, which is stored, while the two-bit area management information is converted to the 12-bit area management flag, which is stored.

That is, the 1-bit area management information of the possible/not possible flag "1", specifying that the block is in the usable state, is converted into the one-byte area management flag "1111 1111" so as to be stored in four cells, while 1-bit area management information "0" of the possible/not possible flag specifying that the block is in the unusable state is converted into the one-byte area management flag "0000 0000" so as to be stored in four cells On the other hand, the 2-bit area management information of the block flag "11", specifying that the block is "unused", is converted into a 12-bit area management flag "111111 111111" so as to be stored in six cells, while the 2-bit area management information of the block flag "11", specifying that the block is "used at leading end", is converted into a 12-bit area management flag "111111 000000" so as to be stored in six cells. Similarly, the 2-bit area management information of the block flag "01", specifying that the block is "used", is converted into a 12-bit area management flag "000000 111111" so as to be stored in six cells, while the 2-bit area management information of the block flag "00", specifying that the block is "not erased as yet", is converted into a 12-bit area management flag "000000 000000" so as to be stored in six cells.

The 1-bit area management information of the last flag "1", specifying that the block is "block continuous", is converted into a six-bit area management flag "111111" so as to be stored in three cells, while 1-bit area management information of the "block last" flag "0", specifying that the block is "block last", is converted into the six-bit area management flag "000000" so as to be stored in three cells.

The 1-bit area management information of the reference flag "1", specifying "there in no reference information", is converted into the six-bit area management flag "111111" so as to be stored in three cells, while 1-bit area management information of the reference flag "0", specifying "there exists the reference information", is converted into a 6-bit area management flag "000000" so as to be stored in three cells.

By appending redundant data to the area management information and storing the resulting signal as an area management flag, the original area management information "1" may be recognized by comparing the number of "0"s and "1"s of the last flag by the flag discrimination circuit 28, even if an error is produced due to cell malfunction such that "111111" is turned to "111100", "110011" or to "001111".

In this case, the area management information and the above-mentioned area management flag are recorded in the conversion table 27 in association with each other.

Also, if the area management information is converted to the area management flag for storage in the management information recording area, 4 bytes are used for the area management flag in its entirety. Therefore, the first four bytes of the 16-byte management information recording area are set for the overwrite area.

The area management information "11" of the block flag specifying that the block is "not as yet used" is converted to the 6-bit area management flag "111111" which is distributed and stored in three cells, while the area management information "10" of the block flag specifying that the block is "used at the leading end" is converted to the 6-bit area management flag "101010" which is distributed and stored in three cells. On the other hand, the area management information "10" of the block flag specifying that the block is "used" is converted to the 6-bit area management flag "010101" which is distributed and stored in three cells, while the area management information "00" of the block flag specifying that the block is "not erased as yet" is converted to the 6-bit area management flag "000000" which is distributed and stored in three cells.

In this case, the flag discrimination circuit 28 recognizes a code pattern on the 2-bit basis to discriminate predominance in a pattern as the original area management information.

Specifically, if the area management information "10" specifying that the block is "used at the leading end" is converted to a 6-bit area management flag "101010" which is distributed and stored in three cells, and a cell is in disorder, the area management flag "101010" is turned to "001010", "011010", "111010", "100010", "100110", "101110", "101000", "101001" or to "101011".

In this case, the flag discrimination circuit 28 recognizes the code pattern of the area management flag on the 2-bit basis to discriminate the predominance of "10" in the pattern as being the original area management information.

If the block flag as the two-bit area management information is stored as the area management flag, the number of bits in use can be reduced.

In the above description, the present invention is applied to the memory card 20 as an external storage device and to the system 1 having the memory card 20 and the data processing device 10. The present invention can, however, be applied to a data processing device having an internal memory. In this case, it suffices if, for storing the area management information in the internal memory, the area management information is converted into and stored as an area management flag comprised of the area management information and the redundant data appended thereto, and the area management flag is converted back into the original area management information when reading out the area management flag from the internal memory.

What is claimed is:

1. A storage device comprising:
   storage means for storing data and an area management information, said area management information being used for supervising a state of an area for storing data;
   first conversion means for converting the area management information into an area management flag corresponding to the area management information and redundant data appended thereto;
   second conversion means for converting the area management flag from the storage means back into the area management information, said area management flag being corrected for errors by said second conversion means without the need for error correction codes to output the area management information originally converted by said first conversion means; and
   control means for writing the area management flag converted by said first conversion means in said storage means and for reading the area management flag from the storage means to send the area management flag to said second conversion means.

2. The storage device according to claim 1 wherein said first conversion means includes a conversion table in which the area management information and the area management flag are recorded in association with each other and wherein the area management information is converted to the area management flag using said conversion table.

3. The storage device according to claim 1 wherein said second conversion means includes a flag discrimination circuit for discriminating the area management information from a pattern of the area management flag read from said storage means; said second conversion means converting the area management flag read from the storage means to the area management information using said flag discrimination circuit.

4. The storage device according to claim 1 wherein said storage means is a flash memory and wherein said first conversion means converts the area management information into the area management flag having at least three bits per one bits of the area management information, said control means causing said area management flag to be distributed and stored in at least three bits of said flash memory.

5. A data processing system comprising:
   a storage device for storing data and an area management information, said area management information being used for supervising a state of an area for storing data; and
   a data processing device for sending data and the area management information to said storage device and for processing data and the area management information supplied from the storage device;
   said storage device converting the area management information supplied from the data processing device into an area management flag corresponding to the area management information and having appended redundant data, said storage device also converting the area management flag stored in said storage device to the area management information to supply the area management information originally converted by said storage device to said data processing device, said area management flag being corrected for errors by said storage device without the need for error correction codes to output the area management information originally converted by said storage device.

6. The data processing system according to claim 5 wherein said storage device has a conversion table in which the area management information and the area management flag are recorded in association with each other and wherein the area management information is converted into the area management flag by having reference to the conversion table.

7. The data processing system according to claim 5 wherein said storage device has a flag discrimination circuit for discriminating the area management information from a pattern of the area management flag stored in said storage device and wherein the area management flag stored in said storage device is converted into the area management information using this flag discrimination circuit.

8. The data processing system according to claim 5 wherein said storage device has a flash memory and wherein said storage device converts the area management information into the area management flag of at least three bits per bit of the area management information, distributes the area management flag in at least three cells of said flash memory and stores the area management flag in a distributed state in said cells.

9. A data writing and readout method in which data and an area management information are written in a storage device and in which data and the area management information written in said storage device are read from said storage device, said area management information being used for supervising a state of an area for storing the data, comprising;
   converting the area management information entering the storage device during data writing into an area management flag corresponding to the area management information and redundant data appended thereto and writing the converted flag in said storage device; and
   converting the area management flag during data readout to the area management information and outputting the area management information originally converted by said storage device from said storage device, said area management flag being corrected for errors by said storage device without the need for error correction codes to output the area management information originally converted by said storage device.

10. The data writing and readout method according to claim 9 wherein said storage device has a conversion table in which the area management information and the area management flag are recorded in association with each other; and wherein during data writing, the area management information is converted into the area management flag by making reference to said conversion table.

11. The data writing and readout method according to claim 9 wherein said storage device has a flag discrimination circuit for discriminating the area management information from the pattern of the area management flag; and wherein during data readout, the area management flag is converted into the area management information using said flag discrimination circuit.

12. The data writing and readout method according to claim 9 wherein said storage device has a flash memory; and wherein the area management information is converted into an area management flag of at least three bits per bit of the information and distributed and written in at least three cells of said flash memory.

* * * * *